United States Patent
Kito

(10) Patent No.: US 6,725,129 B2
(45) Date of Patent: Apr. 20, 2004

(54) POSITIONING DEVICE AND METHOD

(75) Inventor: Takashi Kito, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/234,111

(22) Filed: Sep. 5, 2002

(65) Prior Publication Data
US 2003/0094058 A1 May 22, 2003

(30) Foreign Application Priority Data
Sep. 6, 2001 (JP) .................................. P2001-270974

(51) Int. Cl.$^7$ .................... G01M 1/38; G05B 13/00; G05B 15/00; G05B 21/00; G05D 23/00
(52) U.S. Cl. .................. 700/280; 700/69; 700/71; 700/188; 700/193; 700/56; 318/128
(58) Field of Search ................ 700/56, 57, 61, 700/63, 69, 71, 72, 188, 193, 280; 701/110, 111; 318/568.17, 651, 652, 58, 61, 64, 127, 128

(56) References Cited

U.S. PATENT DOCUMENTS

| | | | |
|---|---|---|---|
| 4,555,758 A | * 11/1985 | Inaba et al. | 700/69 |
| 4,956,789 A | * 9/1990 | Hamada et al. | 700/280 |
| 5,369,568 A | * 11/1994 | Song | 700/61 |
| 5,594,309 A | * 1/1997 | McConnell et al. | 318/568.22 |
| 5,609,230 A | * 3/1997 | Swinbanks | 188/267 |
| 5,742,145 A | * 4/1998 | Khorrami et al. | 318/632 |
| 6,483,269 B2 | * 11/2002 | Sugiyama | 318/569 |
| 6,552,507 B2 | * 4/2003 | Miyazawa | 318/568.11 |
| 6,615,110 B2 | * 9/2003 | Matsuo et al. | 700/245 |

FOREIGN PATENT DOCUMENTS

| | | | | |
|---|---|---|---|---|
| JP | 60-29121 | | 2/1985 | A47L/9/14 |
| JP | 61088306 A | * | 5/1986 | G05B/19/407 |
| JP | 63093004 A | * | 4/1988 | G05B/13/00 |
| JP | 63262707 A | * | 10/1988 | G05D/1/02 |
| JP | 04324507 A | * | 11/1992 | G05D/3/12 |
| JP | 5-270786 | | 10/1993 | B66C/13/22 |
| JP | 06114762 A | * | 4/1994 | B25J/9/10 |
| JP | 6-170769 | | 6/1994 | B25J/13/08 |
| JP | 7-328965 | | 12/1995 | B25J/9/10 |

* cited by examiner

Primary Examiner—Ramesh Patel
Assistant Examiner—Crystal J. Barnes
(74) Attorney, Agent, or Firm—Rader, Fishman & Grauer PLLC; Ronald P. Kananen

(57) ABSTRACT

A positioning device and method can position a subject of positioning at a higher speed than conventional ones. A positioning device and method for moving a subject of positioning to a desired position, moves the subject of positioning at a desired speed and acceleration, and adjusts the acceleration/deceleration duration of the subject of positioning and the timing of starting the deceleration so as to cancel the residual vibration, in accordance with the vibration period of the residual vibration that occurs immediately after positioning the subject of positioning.

12 Claims, 10 Drawing Sheets

POSITIONING DEVICE AND METHOD

BACKGROUND OF THE INVENTION

1. Field of the Invention

The present invention relates to a positioning device and method, and, more suitably, is applicable to a mounter for carrying semiconductor devices onto a substrate.

2. Description of the Related Art

In the mounter of this sort, a motion pattern of a head is determined using a targeted locus calculated on the basis of a so-called trapezoidal speed command, in controlling the positioning by moving the head for adsorbing a semiconductor device in the X-axis and Y-axis directions.

This trapezoidal speed command is a targeted locus for the head to be moved from a current position to a targeted position through the process of acceleration, constant velocity and deceleration. A typical method for generating a trapezoidal speed command involves determining the acceleration and the deceleration to be used, and changing the acceleration duration, the constant velocity duration and the deceleration duration in accordance with a targeted travel distance.

For example, when a travel distance xm, a maximum speed $V_{max}$m/s, and a maximum acceleration $a_{max}$m/s² are given as a travel command as shown in FIG. 1, a targeted locus is generated for the travel distance by using the same acceleration until the speed reaches the maximum speed. The speed locus of this situation is triangular or trapezoidal, as shown in FIG. 2, and the acceleration duration and the deceleration duration vary in a triangular speed locus, that is, if a travel distance is between 0 and $(V_{max}^2/a_{max})$m.

In such a mounter, if the acceleration for moving the head is made faster for fast positioning, a greater reaction force is produced in moving the head, and vibration is more likely to occur from a base board of the mounter via a head supporting portion to the head.

To suppress the residual vibration in arriving at the targeted position within a targeted positioning precision, acceleration slower than the acceleration that a drive system of the head can intrinsically produce is used as the maximum acceleration.

When a targeted-value generating method having a fixed maximum speed and maximum acceleration as described above is used, however, the frequency properties of the acceleration and the deceleration components for the targeted locus varying with the acceleration and deceleration duration and the timing of starting the deceleration are not considered, although the conditions for the maximum speed and the maximum acceleration are satisfied.

Due to variations in the frequency properties of acceleration in this targeted locus, the condition of the residual vibration at the completion of positioning is changed at a control point for a subject of positioning, which is a problem.

To solve this problem, there is offered a method for reducing the residual vibration in the positioning control by controlling the acceleration duration and the deceleration duration.

To begin with, a first method (Japanese Patent Publication No. 60-29121, Japanese Patent Laid-Open No. 05-270786, Japanese Patent Laid-Open No. 06-170769, and Japanese Patent Laid-Open No. 07-328965) is a method for reducing residual vibration by setting the acceleration duration and the deceleration duration to be an integer multiple of a natural frequency of vibration. This method is employed in robot manipulators and cranes and is used for positioning in which the acceleration duration is an integer multiple of the residual vibration period.

However, in many cases, the mounter makes movements in which the acceleration duration is shorter than the vibration period of residual vibration. Therefore, when the acceleration/deceleration duration is lengthened to damp the residual vibration with a targeted locus by using this method as it is, it surely took a time equal to two periods of residual vibration in such a short distance that the targeted position is reached within the acceleration and deceleration duration, in the typical targeted locus (acceleration and deceleration duration, each 0.1 sec, equivalent to one period of residual vibration 10 Hz), as shown in FIG. 3, which has a problem in that the high speed is very difficult to achieve.

A second method (Japanese Patent Laid-Open No. 2000-298521) involves making the damping by the use of a database including the travel time and the degree of damping, while satisfying the conditions of the maximum speed and the maximum acceleration with the positioning time as a parameter.

However, with this method, it is required to create the data for the travel time and the degree of damping to effect the damping for each device, which has a problem in that the operation is very complex.

Moreover, a third method (Japanese Patent Laid-Open No. 05-108165) involves dividing by two a targeted locus obtained by adding a targeted locus and the same targeted locus shifted by a half period of a frequency set for damping (hereinafter referred to as a damping frequency) that is given at the time of making a travel command.

However, with this method, the damping can be performed on the vibration frequency that is an odd multiple of the damping frequency, but it cannot be made for an even multiple of the vibration frequency. Furthermore, the damping is possible for any two or more frequencies by repeating the same method in series twice or more, but there is a problem that the completion time of generation of the targeted locus is delayed by the time of adding a half period of the damping frequency.

Accordingly, as a condition for solving the problems of the first to third methods, it is desirable to change the acceleration duration and the deceleration duration in accordance with the vibration period of the residual vibration having the greatest amplitude that occurs at the positioning completion time to prevent this vibration from occurring as much as possible.

SUMMARY OF THE INVENTION

In view of the foregoing, an object of this invention is to provide a positioning device and method that can position a subject of positioning at a higher speed than conventional ones.

The foregoing object and other objects of the invention have been achieved by the provision of a positioning device for moving a subject of positioning to a desired position. The positioning device comprises a drive means for driving to move the subject of positioning and a control means for controlling the drive means to move the subject of positioning at a desired speed and acceleration based on a trapezoidal speed command. The control means controls the drive means to adjust the acceleration/deceleration duration of the subject of positioning and the timing of starting the deceleration to cancel the residual vibration in accordance with the vibration period of residual vibration that occurs immediately after positioning the subject of positioning.

As a result, this positioning device can efficiently cancel the residual vibration which occurs in the subject of positioning at the time of positioning.

Also, in this invention, a positioning method for moving a subject of positioning to a desired position moves the subject of positioning at a desired speed and acceleration based on a trapezoidal speed command and adjusts the acceleration/deceleration duration of the subject of positioning and the timing of starting the deceleration to cancel the residual vibration in accordance with the vibration period of residual vibration that occurs immediately after positioning the subject of positioning.

As a result, this positioning method makes it possible to efficiently cancel the residual vibration which occurs in the subject of positioning at the time of positioning.

As described above, in this invention, a positioning device for moving a subject of positioning to a desired position is provided with a drive means for driving to move the subject of positioning and a control means for controlling the drive means to move the subject of positioning at a desired speed and acceleration. The control means controls the drive means to adjust the acceleration/deceleration duration of the subject of positioning and the timing of starting the deceleration to cancel the residual vibration in accordance with the vibration period of the residual vibration that occurs immediately after positioning the subject of positioning. As a result, this positioning device can efficiently cancel the residual vibration which occurs in the subject of positioning at the time of positioning. Thus, it is possible to implement the positioning device that can position the subject of positioning at a higher speed than conventional ones.

Also, in this invention, a positioning method for moving a subject of positioning to a desired position moves the subject of positioning at a desired speed and acceleration and adjusts the acceleration/deceleration duration of the subject of positioning and the timing of starting the deceleration to cancel the residual vibration in accordance with the vibration period of the residual vibration that occurs immediately after positioning the subject of positioning. As a result, this positioning method makes it possible to efficiently cancel the residual vibration which occurs in the subject of positioning at the time of positioning. Thus, it is possible to implement the positioning method that can position the subject of positioning at a higher speed than conventional ones.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Mounter Construction of this Embodiment

Figure 1:
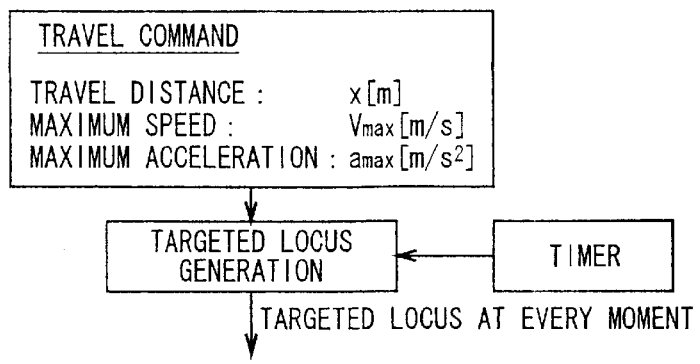
FIG. 1 is a concept diagram explaining a conventional, targeted locus generating method.
Figure 2:
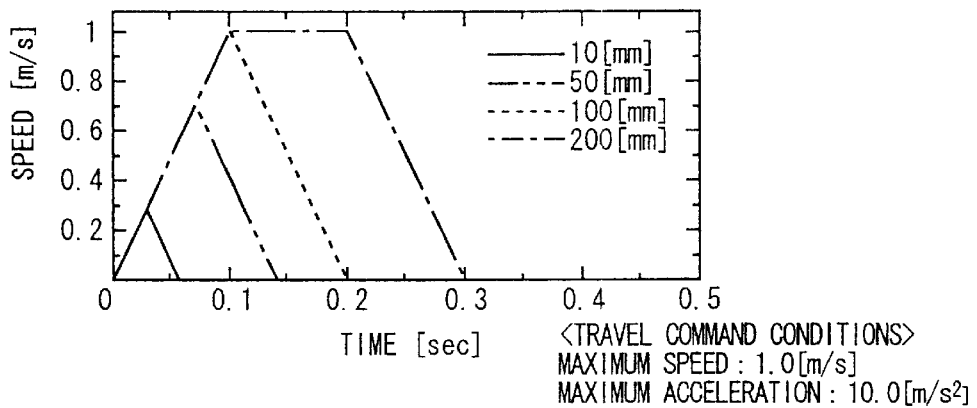
FIGS. 2 and 3 are graphs showing a conventional targeted locus.
Figure 3:
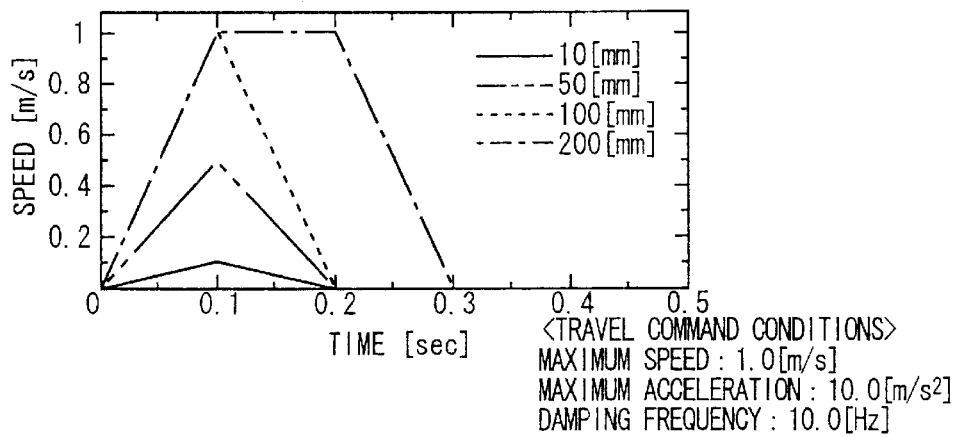
Figure 4:
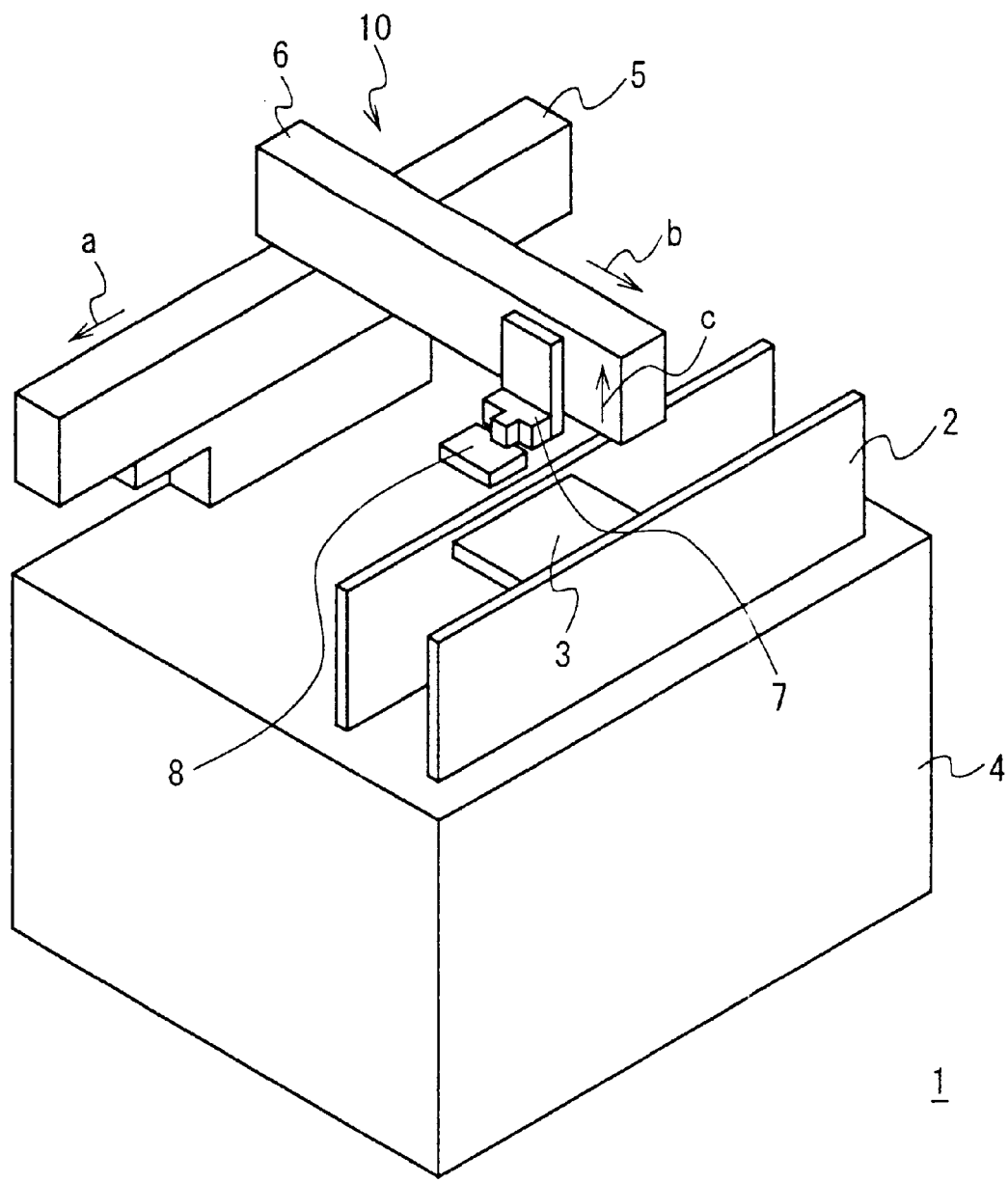
FIG. 4 is a schematic perspective view showing the construction of a mounter according to this embodiment.

In FIG. 4, reference numeral 1 denotes a mounter as a whole according to this embodiment. The mounter 1 securely holds a substrate 3 of a work-piece at a predetermined position on a frame 4 for a certain time, the substrate 3 being carried to the predetermined position on the frame 4 by a substrate carrying portion 2.

On this frame 4, a head 8 is disposed via a first movable body 5 that is freely movable in a forward direction indicated by an arrow "a" relative to the frame 4 and in its opposite backward direction, a second movable body 6 that is freely movable in a right direction indicated by the arrow "b" relative to the first movable body 5 and in its opposite left direction, and a third movable body 7 that is freely movable in an upward direction indicated by the arrow "c" relative to the second movable body 6 and in its opposite downward direction in succession.

The head 8 has a head main body (not shown) fixed onto the third movable body 7, and an exhaust port of the head main body is provided in a pipe (not shown) leading to a negative pressure source (not shown), so that a lower end portion of the head 8 can adsorb a semiconductor device with a negative pressure given from the negative pressure source via the pipe to the head 8.

In this mounter 1, the semiconductor device supplied on the frame 4 can be adsorbed to the lower end portion of the head 8 and carried by driving a movable portion 10 composed of the first to third movable bodies 5 to 7 with the negative pressure source, whereby the semiconductor device can be mounted on a corresponding land of the substrate 3.

In operation, actually, this mounter 1 securely holds the substrate 3 of a work-piece at a predetermined position on the frame, the substrate 3 being carried to the predetermined position by the substrate carrying portion 2, and then the head 8 is moved above a supply position of the semiconductor device by driving the movable portion 10, and then moved down, so that the lower end portion of the head 8 is caused to contact closely with or approach the semiconductor device at the supply position.

Subsequently, the head 8 starts to suck the semiconductor device by driving the negative pressure source, whereby the semiconductor device is adsorbed to the lower end portion of the head 8 one by one.

Then, the head 8 is moved up by driving the movable portion 10 to a predetermined position above the substrate 3 securely held on the substrate carrying portion 2, and then it is moved down.

Moreover, the movable portion 10 is stopped when the semiconductor device held by adsorption on the head 8 contacts the corresponding land of the substrate 3, and then the negative pressure source is stopped to release the semiconductor device held by adsorption. Thereby, the semiconductor device adsorbed to the lower end portion of the head 8 is mounted on the substrate 3.

Thus, in this mounter 1, the head 8 is moved up by driving the movable portion 10, and the substrate carrying portion 2 carries this substrate 3. And after that, the same operation is repeated successively, so that the semiconductor devices can be mounted on the lands of the substrate 3 supplied to the substrate carrying portion 2 one by one.

(2) Hardware Construction of Mounter

Figure 5:
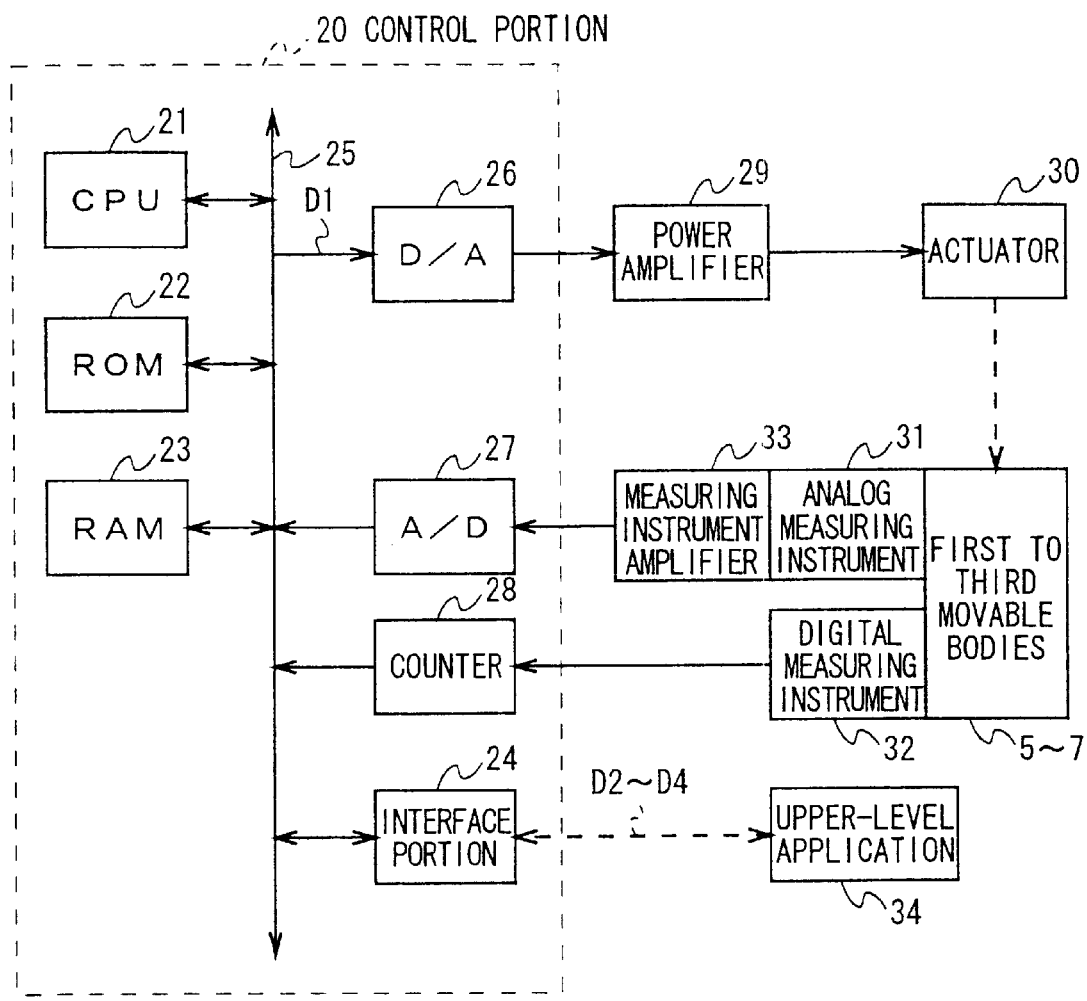
FIG. 5 is a block diagram showing the hardware construction inside the mounter shown in FIG. 4.

FIG. 5 shows the circuit construction of a control portion 20 for controlling the operation of each section in the aforementioned mounter 1. This control portion 20 has a central processing unit (CPU) 21 for controlling the whole operation, a read only memory (ROM) 22 for storing various kinds of software, a random access memory (RAM) 23 as a work memory for the CPU 21, and an interface portion 24 via which the CPU 21 communicates with the outside through a network, these being interconnected with a bus 25.

Further, the control portion 20 is connected with the bus 25 to a D/A converter 26, an A/D converter 27 and a counter 28, in which drive data D1 supplied from the CPU 21 is converted by the D/A converter 26 into an analog voltage, and the analog voltage is amplified by a power amplifier 29 and is given to an actuator 30 of the movable portion 10 (FIG. 4), and thereby the first to third movable bodies 5 to 7 making up the movable portion 10 are driven into desired states.

And, the first to third movable bodies 5 to 7 have an analog measuring instrument 31 and a digital measuring instrument 32 attached thereto, to measure the drive states of the actuator main bodies of the first to third movable bodies 5 to 7 or of a power-transmission mechanism comprising a ball screw, a rack and pinion, and a timing belt in an analog or a digital quantity. The measured result of analog quantity is amplified by a measuring instrument amplifier 33, converted into a digital quantity by the A/D converter 27 inside the control portion 20 and sent to the CPU 21, and the measured result of digital quantity is converted into a count value by a counter 28 inside the control portion 20 and sent to the CPU 21.

Consequently, the CPU 21 can perform feedback control on the first to third movable bodies 5 to 7 into desired states, based on the drive states of the first to third movable bodies 5 to 7 making up the movable portion 10 (FIG. 4).

The CPU 21 receives travel command information D2 and the frequency information D3 representing the damping frequency $f_c$Hz (both will be described later with reference to FIG. 8), and various kinds of sensor information D4 supplied from an external upper-level application 34, via the interface portion 24, and performs various kinds of processes based on the travel command information D2 to D4 and the software stored in the ROM 22.

(3) Targeted Locus Generating Method of this Embodiment (3-1) Principle of Canceling Vibration In the case of canceling a residual vibration which occurs immediately after positioning the subject of positioning during movement, a combination of two damping methods for damping by acceleration the subject of positioning (hereinafter referred to as acceleration damping) and for damping by deceleration the subject of positioning (hereinafter referred to as deceleration damping) is applied to the generation of the targeted locus based on the trapezoidal speed command.

Herein, the acceleration damping is a control for canceling residual vibration by applying vibration caused by the input of arbitrary force, like vibration to an input of impulse, with the same force in the same direction after a half period of the residual vibration which occurs in the subject of positioning.

Figure 6A:
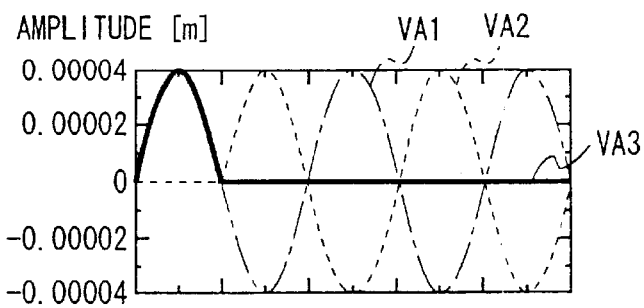
FIGS. 6A and 6B are graphs explaining the acceleration damping.
Figure 6B:
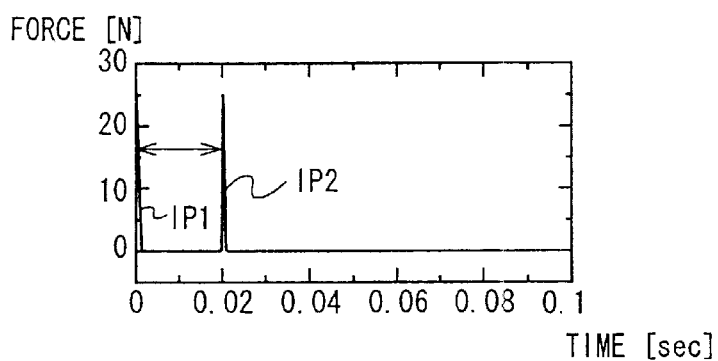

Specifically, if a first impulse input (about 25N) IP1 is applied, and after 0.02 sec, a second impulse input IP2 is applied with the same force in the same direction (FIG. 6B), the vibration amplitude VA3 with the residual vibration canceled can be obtained by adding the vibration VA2 corresponding to the second impulse input IP2 to the vibration VA1 corresponding to the first impulse input IP1 after a half period, as shown in FIGS. 6A and 6B.

To apply this principle of acceleration damping to the generation of the targeted locus based on the trapezoidal speed command, the residual vibration is cancelled by adjusting the acceleration/deceleration duration to be a positive integer multiple of one period of residual vibration, which occurs in the subject of positioning, by giving an impulse input.

On the other hand, the deceleration damping is a control for canceling residual vibration by applying vibration caused by the input of arbitrary force, like vibration to an impulse input, with the same force in the opposite direction after a positive integer multiple of one period of the residual vibration which occurs in the subject of positioning.

Figure 7A:
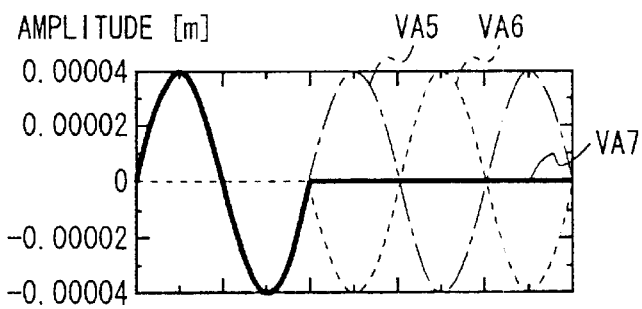
FIGS. 7A and 7B are graphs explaining the deceleration damping.
Figure 7B:
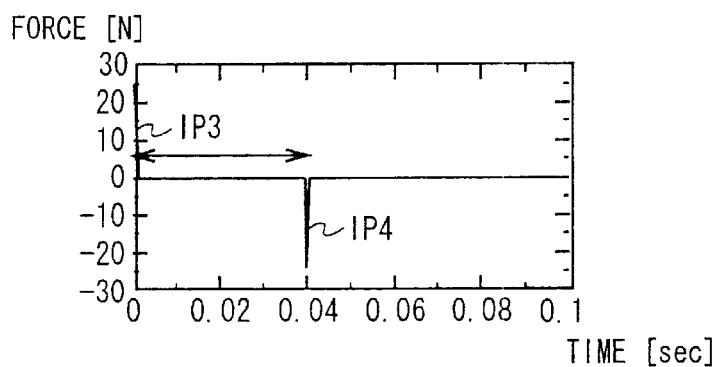

Specifically, if a first impulse input (about 25N) IP3 is applied, and after 0.04 sec, a second impulse input IP4 is applied with the same force in the opposite direction (FIG. 7B), the vibration amplitude VA7 with the residual vibration canceled can be obtained by adding the vibration VA6 corresponding to the second impulse input IP4 to the vibration VA5 corresponding to the first impulse input IP3 after a positive integer multiple of one period, as shown in FIGS. 7A and 7B.

To apply this principle of deceleration damping to the generation of the targeted locus based on the trapezoidal speed command, residual vibration is cancelled by adjusting the deceleration timing to start deceleration a positive integer multiple of one period of residual vibration, which occurs in the subject of positioning, after the acceleration start time by giving an impulse input.

In this manner, both the acceleration damping and deceleration damping methods are selectively switched depending on the travel distance of the subject of positioning and combined, whereby even if the subject of positioning takes any travel distance, it is possible to derive such a targeted locus capable of making the fastest movement so as to cancel the residual vibration.

(3-2) Targeted Locus Generating Process

Figure 8:
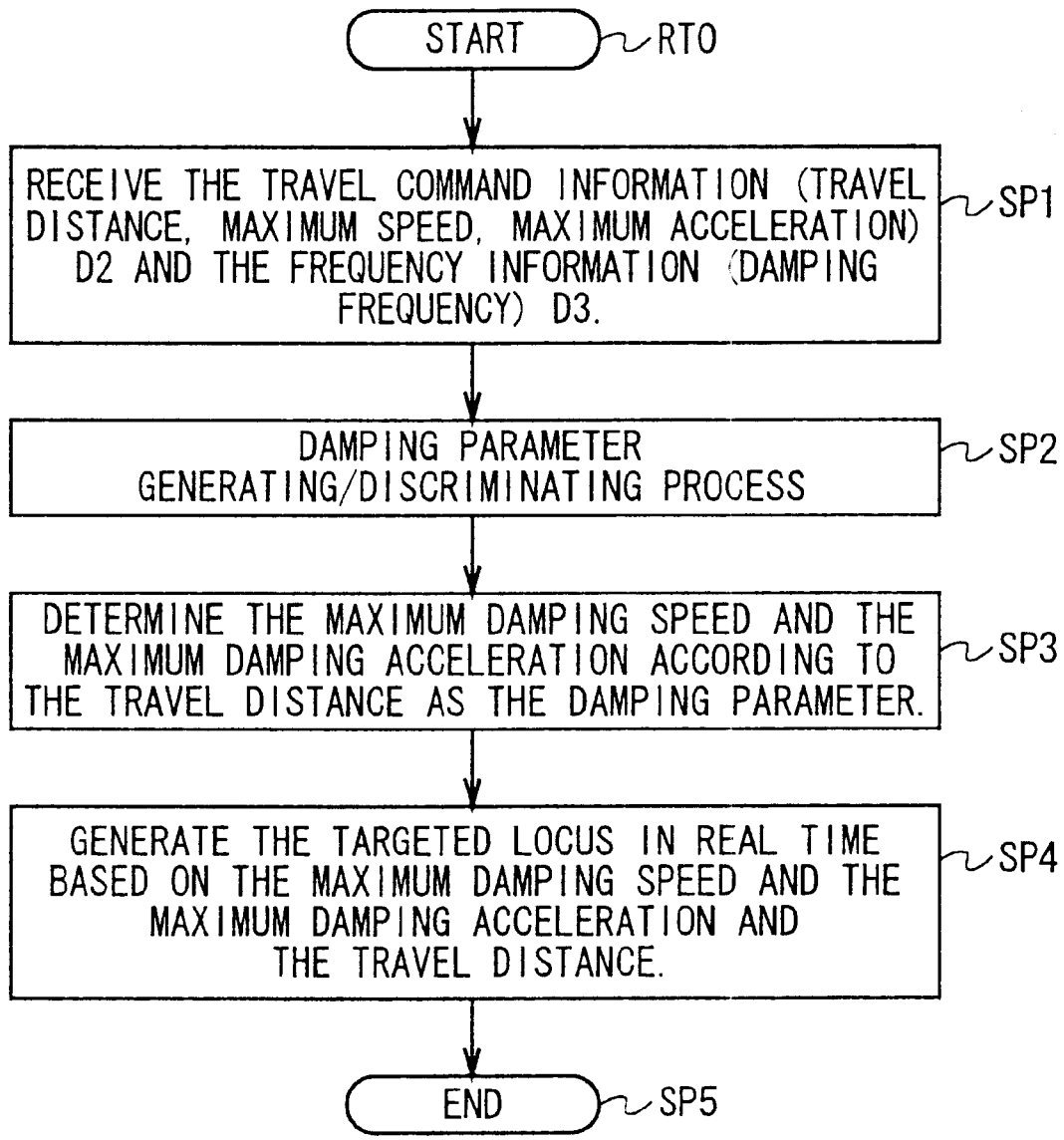
FIG. 8 is a flowchart explaining a targeted locus generating procedure.

In practice, the CPU 21 generates a targeted locus based on a trapezoidal speed command while a subject of positioning is moved, using a combination of the acceleration damping and the deceleration damping, in accordance with a targeted locus generating procedure RT0, as shown in FIG. 8.

First of all, at step SP1, the CPU 21 receives travel command information D2 composed of a travel distance xm, a maximum speed $V_{max}$m/s and maximum acceleration $a_{max}$m/s$^2$ and frequency information D3 representing a damping frequency $f_c$Hz from an upper-level application.

Then at step SP2, a damping parameter generating/discriminating process is performed based on the maximum speed $V_{max}$m/s, the maximum acceleration $a_{max}$m/s² and the damping frequency $f_c$Hz.

In this damping parameter generating/discriminating process, assuming that the speed obtained by making the acceleration for duration $1/f_c$ equivalent to one period of the damping frequency $f_c$Hz that is to be damped at the maximum acceleration $a_{max}$m/s² (hereinafter referred to as a damping frequency speed) is $V_{freq}(=a_{max}/f_c)$m/s, the maximum speed $V_{max}$m/s known from the specifications of the head drive system is classified into one of six levels (low speed, first and second middle speeds, first, second and third high speeds), as shown in FIGS. 9 to 12.

In this embodiment, if the maximum speed $V_{max}$m/s is 0 or over and the damping frequency speed $V_{freq}$ or less, as indicated by the following expression (1), it is considered as the low speed.

$$0 \leq V_{max} \leq V_{freq} \quad (1)$$

Also, if the maximum speed $V_{max}$m/s is larger than the damping frequency speed $V_{freq}$ and three-halves of the damping frequency speed $V_{freq}$ or less, as indicated by the following expression (2), it is considered as the first middle speed.

$$v_{freq} < v_{max} \leq 3/2 v_{freq} \quad (2)$$

Also, if the maximum speed $V_{max}$m/s is larger than three-halves of the damping frequency speed $V_{freq}$ and twice the damping frequency speed $V_{freq}$ or less, as indicated by the following expression (3), it is considered as the second middle speed.

$$3/2 v_{freq} < v_{max} \leq 3/2 v_{freq} \quad (3)$$

Also, if the maximum speed $V_{max}$m/s is larger than twice the damping frequency speed $V_{freq}$ and five-halves of the damping frequency speed $V_{freq}$ or less, as indicated by the following expression (4) it is considered as the first high speed.

$$2 v_{freq} < v_{max} \leq 5/2 v_{freq} \quad (4)$$

Also, if the maximum speed $V_{max}$m/s is larger than five-halves of the damping frequency speed $V_{freq}$ and eight-thirds of the damping frequency speed $V_{freq}$ or less, as indicated by the following expression (5), it is considered as the second high speed.

$$5/2 v_{freq} < v_{max} \leq 8/3 v_{freq} \quad (5)$$

Also, if the maximum speed $V_{max}$m/s is larger than eight-thirds of the damping frequency speed $V_{freq}$ and three times the damping frequency speed $V_{freq}$ or less, as indicated by the following expression (6), it is considered as the third high speed.

$$8/3 v_{freq} < v_{max} \leq 3 v_{freq} \quad (6)$$

In the above classification used as an example, there is such a limitation that the maximum speed $V_{max}$m/s is three times or less the damping frequency speed $V_{freq}$m/s or the damping frequency $f_c$Hz is $3 \times a_{max}/V_{max}$Hz or less.

Subsequently, at step SP3, the CPU 21 calculates the maximum damping speed $v_c$m/s and the maximum damping acceleration $a_c$m/s² based on the travel distance xm for each of six levels of the maximum speed $V_{max}$m/s (low speed, first and second middle speeds, first, second and third high speeds) that are obtained as the above results of classification.

Figure 10:
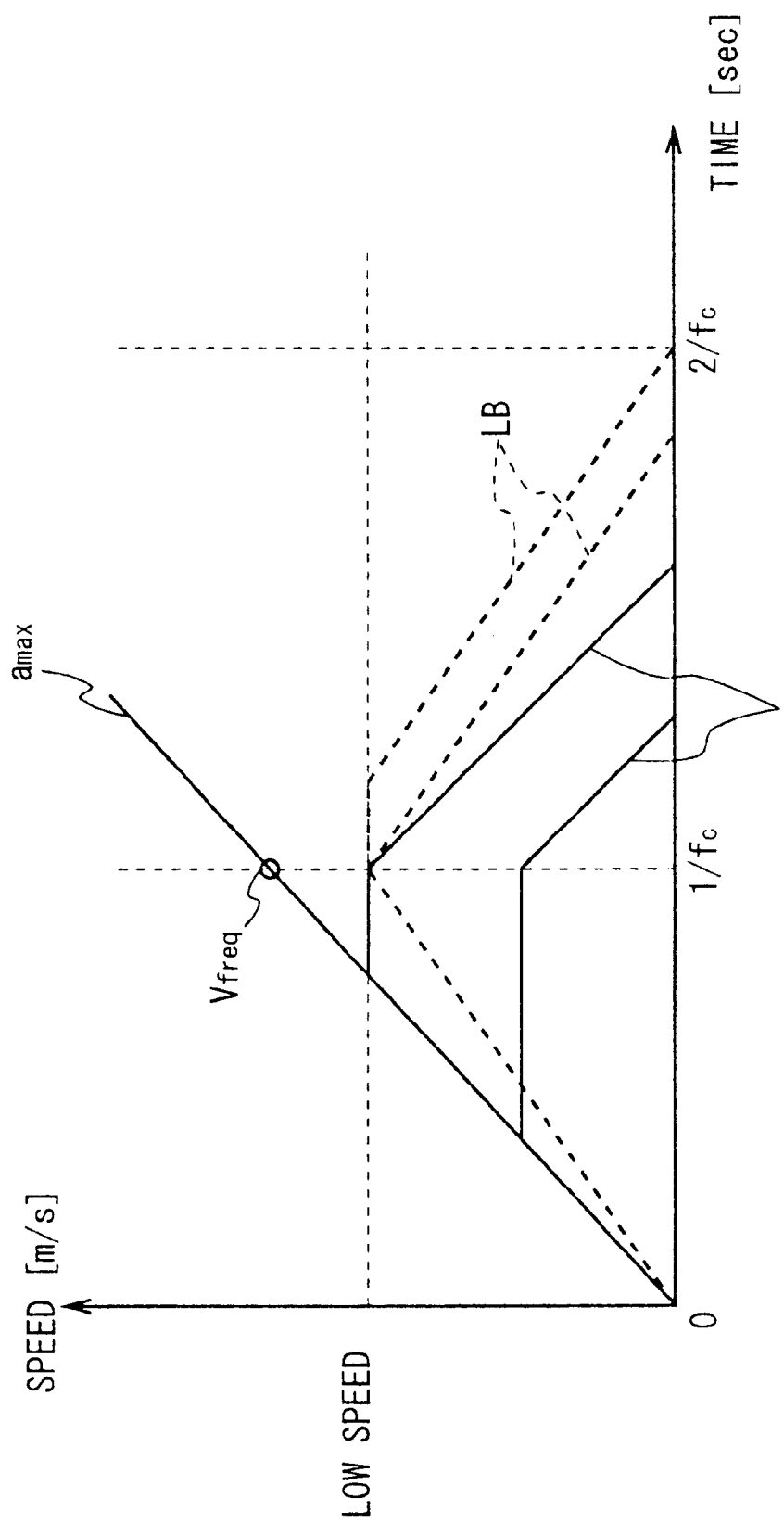
FIG. 10 is a graph explaining a method for calculating the maximum damping speed and the maximum damping acceleration in the case of a low speed.

Specifically, firstly, in the case of the low speed, when the travel distance xm falls within a range indicated by the following expression (7), as shown in FIG. 10, the deceleration damping for one period is performed.

$$0 \leq x \leq \frac{v_{max}}{f_c} \quad (7)$$

Thereby, the maximum damping speed $v_c$m/s is set as the product of the travel distance xm and the damping frequency $f_c$Hz, as indicated by the following expression (8).

$$v_c = x f_c \quad (8)$$

And the maximum damping acceleration $a_c$m/s² is set to a value (solid line LA in FIG. 10) equal to the maximum acceleration $a_{max}$m/s², as indicated by the following expression (9).

$$a_c = a_{max} \quad (9)$$

Also, when the travel distance xm falls within a range indicated by the following expression (10), the acceleration damping for one period is performed.

$$\frac{v_{max}}{f_c} < x \quad (10)$$

Thereby, the maximum damping speed $v_c$m/s is set to a value equal to the maximum speed $V_{max}$m/s, as indicated by the following expression (11).

$$v_c = V_{max} \quad (11)$$

And the maximum damping acceleration $a_c$m/s² is set to the product (broken line LB in FIG. 10) of the maximum speed $V_{max}$m/s and the damping frequency $f_c$Hz, as indicated by the following expression (12).

$$a_c = V_{max} f_c \quad (12)$$

Figure 11:
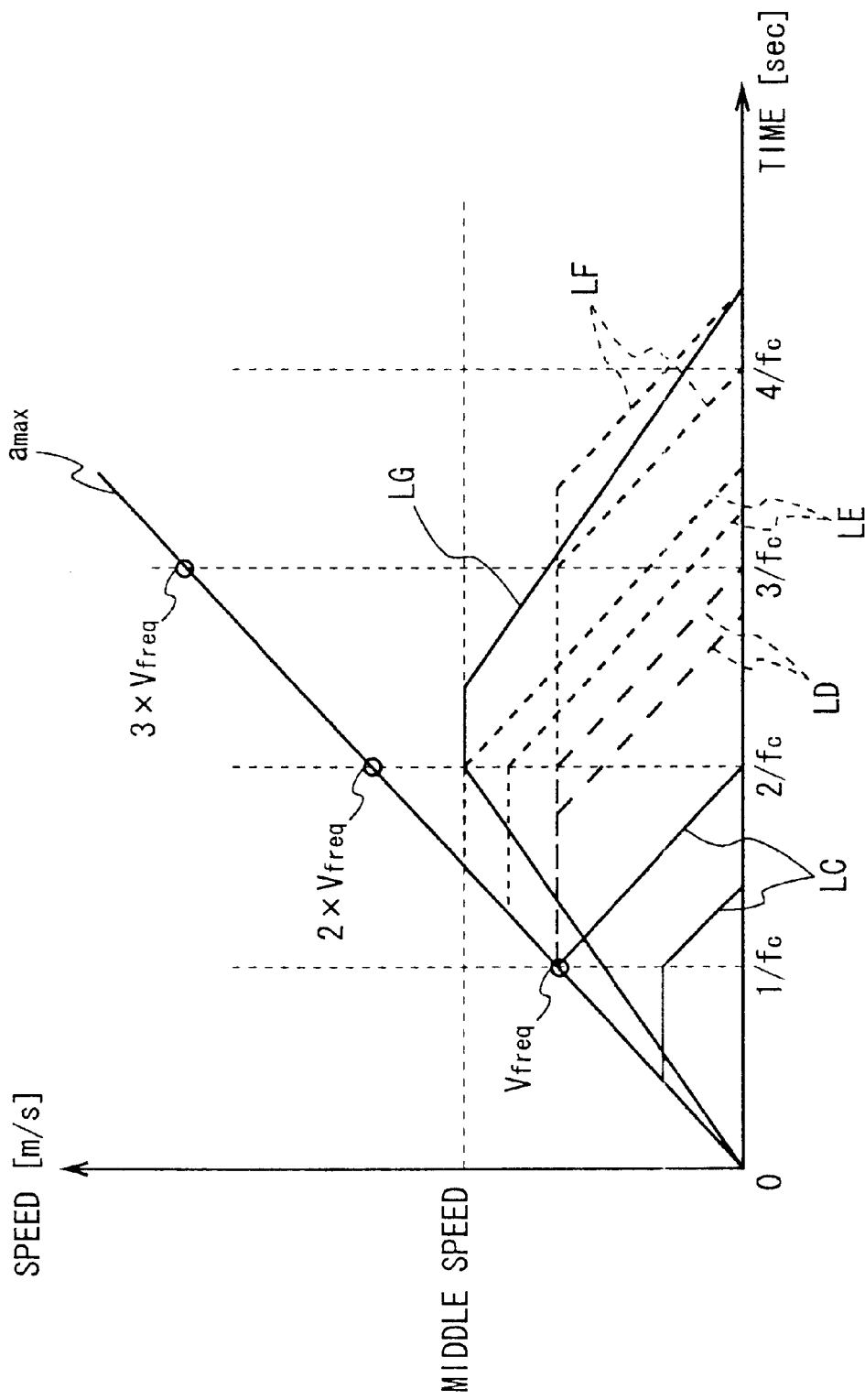
FIG. 11 is a graph for explaining a method for calculating the maximum damping speed and the maximum damping acceleration in the case of a middle speed.

Subsequently, in the case of a middle speed (first or second middle speeds), if the travel distance xm falls within a range indicated by the following expression (13), as shown in FIG. 11, the deceleration damping for one period is performed.

$$0 \leq x \leq \frac{v_{freq}}{f_c} \quad (13)$$

Thereby, the maximum damping speed $v_c$m/s is set as the product of the travel distance xm and the damping frequency $f_c$Hz, as indicated by the following expression (14).

$$v_c = x f_c \quad (14)$$

And the maximum damping acceleration $a_c$m/s² is set to a value (solid. line LC in FIG. 11) equal to the maximum acceleration $a_{max}$m/s², as indicated by the following expression (15).

$$a_c = a_{max} \quad (15)$$

Also, if the travel distance xm falls within a range indicated by the following expression (16), the acceleration damping for one period is performed.

$$\frac{v_{freq}}{f_c} < x \le 2\frac{v_{freq}}{f_c} \quad (16)$$

Thereby, the maximum damping speed $v_c$ m/s is set to a value equal to the damping frequency speed $V_{freq}$ m/s, as indicated by the following expression (17).

$$v_c = v_{freq} \quad (17)$$

And the maximum damping acceleration $a_c$ m/s² is set to a value (broken line LD in FIG. 11) equal to the maximum acceleration $a_{max}$ m/s², as indicated by the following expression (18).

$$a_c = a_{max} \quad (18)$$

And if the travel distance xm falls within a range indicated by the following expression (19), the deceleration damping for two periods is performed.

$$2\frac{v_{freq}}{f_c} < x \le 2\frac{v_{max}}{f_c} \quad (19)$$

Thereby, the maximum damping speed $v_c$ m/s is set to a half value of the product of the travel distance xm and the damping frequency $f_c$ Hz, as indicated by the following expression (20).

$$v_c = \frac{x f_c}{2} \quad (20)$$

And the maximum damping acceleration $a_c$ m/s² is set to a value (broken line LE in FIG. 11) equal to the maximum acceleration $a_{max}$ m/s², as indicated by the following expression (21).

$$a_c = a_{max} \quad (21)$$

Moreover, if the travel distance xm is larger than the maximum value, as indicated by the expression (19), the maximum damping speed $v_c$ m/s and the maximum damping acceleration $a_{max}$ m/s² have different values depending on the first middle speed and the second middle speed.

That is, in the case of the first middle speed, if the travel distance xm falls within a range indicated by the following expression (22), the acceleration damping for one period is performed.

$$2\frac{v_{max}}{f_c} < x \le \frac{v_{max} v_{freq}}{f_c(v_{max} - v_{freq})} \quad (22)$$

Thereby, the maximum damping speed $v_c$ m/s is set to a value equal to the damping frequency speed $V_{freq}$, as indicated by the following expression (23).

$$v_c = v_{freq} \quad (23)$$

And, the maximum damping acceleration $a_c$ m/s² is set to a value (broken line LF in FIG. 11) equal to the maximum acceleration $a_{max}$ m/s², as indicated by the following expression (24).

$$a_c = a_{max} \quad (24)$$

And, if the travel distance xm falls within a range indicated by the following expression (25), the acceleration damping for two periods is performed.

$$\frac{v_{max} v_{freq}}{f_c(v_{max} - v_{freq})} < x \quad (25)$$

Thereby, the maximum damping speed $v_c$ m/s is set to a value equal to the maximum speed $V_{max}$ m/s, as indicated by the following expression (26).

$$v_c = V_{max} \quad (26)$$

And, the maximum damping acceleration $a_c$ m/s² is set to a half value (solid line LG in FIG. 11) of the product of the maximum speed $V_{max}$ m/s and the damping frequency $f_c$ Hz, as indicated by the following expression (27).

$$a_c = \frac{v_{max} f_c}{2} \quad (27)$$

On the other hand, in the case of the second middle speed, if the travel distance xm falls within a range indicated by the following expression (28), the acceleration damping for one period is performed.

$$2\frac{v_{max}}{f_c} < x \quad (28)$$

Thereby, the maximum damping speed $v_c$ m/s is set to a value equal to the maximum speed $V_{max}$ m/s, as indicated by the following expression (29).

$$v_c = V_{max} \quad (29)$$

And, the maximum damping acceleration $a_c$ m/s² is set to a half value (broken line LF in FIG. 11) of the product of the maximum speed $V_{max}$ m/s and the damping frequency $f_c$ Hz, as indicated by the following expression (30).

$$a_c = \frac{v_{max} f_c}{2} \quad (30)$$

Figure 12:
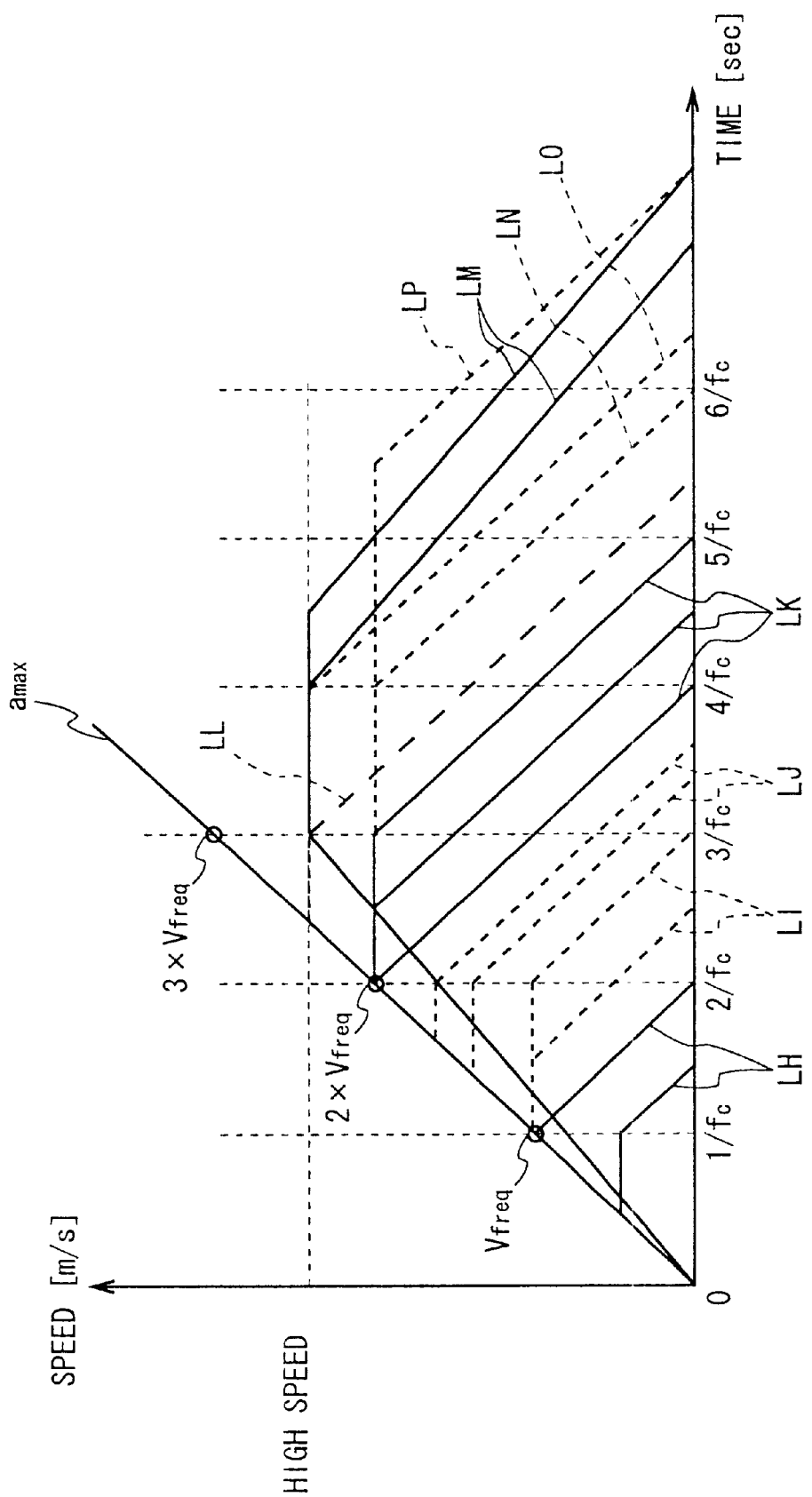
FIG. 12 is a graph for explaining a method for calculating the maximum damping speed and the maximum damping acceleration in the case of a high speed.
Figure 13:
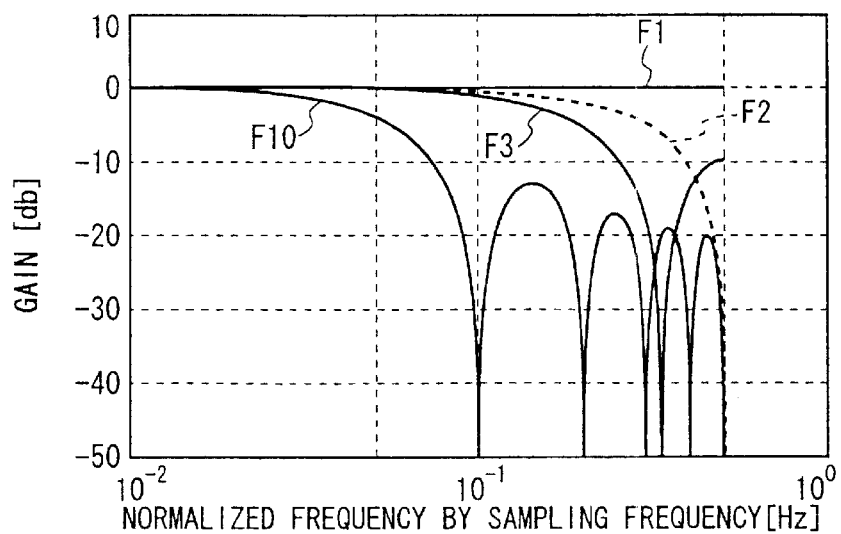
FIG. 13 is a graph showing the frequency properties of a jerk filter.

Subsequently, in the case of the high speed (first, second and third high speeds), if the travel distance xm falls within a range indicated by the following expression (31), as shown in FIG. 12, the deceleration damping for one period is performed.

$$0 \le x \le \frac{v_{freq}}{f_c} \quad (31)$$

Thereby, the maximum damping speed $v_c$ m/s is set as the product of the travel distance xm and the damping frequency $f_c$ Hz, as indicated by the following expression (32).

$$v_c = x f_c \quad (32)$$

And, the maximum damping acceleration $a_c$ m/s² is set to a value (solid line LH in FIG. 12) equal to the maximum acceleration $a_{max}$ m/s², as indicated by the following expression (33).

$$a_c = a_{max} \quad (33)$$

Also, if the travel distance xm falls within a range indicated by the following expression (34), the acceleration damping for one period is performed.

$$\frac{v_{freq}}{f_c} < x \le 2\frac{v_{freq}}{f_c} \quad (34)$$

Thereby, the maximum damping speed $v_c$ m/s is set to a value equal to the damping frequency speed $V_{freq}$ m/s, as indicated by the following expression (35).

$$v_c = v_{freq} \quad (35)$$

And, the maximum damping acceleration $a_c$ m/s$^2$ is set to a value (broken line LI in FIG. 12) equal to the maximum acceleration $a_{max}$ m/s$^2$, as indicated by the following expression (36).

$$a_c = a_{max} \quad (36)$$

And, if the travel distance xm falls within a range indicated by the following expression (37), the deceleration damping for two periods is performed.

$$2\frac{v_{freq}}{f_c} < x \le 4\frac{v_{freq}}{f_c} \quad (37)$$

Thereby, the maximum damping speed $v_c$ m/s is set to a half value of the product of the travel distance xm and the damping frequency $f_c$ Hz, as indicated by the following expression (38).

$$v_c = \frac{xf_c}{2} \quad (38)$$

And, the maximum damping acceleration $a_c$ m/s$^2$ is set to a value (broken line LJ in FIG. 12) equal to the maximum acceleration $a_{max}$ m/s$^2$, as indicated by the following expression (39).

$$a_c = a_{max} \quad (39)$$

Moreover, if the travel distance xm falls within a range indicated by the following expression (40), the acceleration damping for two periods is performed.

$$4\frac{v_{freq}}{f_c} < x \le 6\frac{v_{freq}}{f_c} \quad (40)$$

Thereby, the maximum damping speed $v_c$ m/s is set to a value twice the value of the damping frequency speed $V_{freq}$ m/s, as indicated by the following expression (41).

$$v_c = 2v_{freq} \quad (41)$$

And, the maximum damping acceleration $a_c$ m/s$^2$ is set to a value solid line LK in FIG. 12) equal to the maximum acceleration $a_{max}$ m/s$^2$, as indicated by the following expression (42).

$$a_c = a_{max} \quad (42)$$

Moreover, if the travel distance xm falls within a range indicated by the following expression (43), the acceleration damping for two periods is performed.

$$6\frac{v_{freq}}{f_c} < x \le 3\frac{v_{max}}{f_c} \quad (43)$$

Thereby, the maximum damping speed $v_c$ m/s is set to a one-third value of the product of the travel distance xm and the damping frequency $f_c$ Hz, as indicated by the following expression (44).

$$v_c = \frac{xf_c}{3} \quad (44)$$

And, the maximum damping acceleration $a_c$ m/s$^2$ is set to a value (broken line LL in FIG. 12) equal to the maximum acceleration $a_{max}$ m/s$^2$ as indicated by the following expression (45).

$$a_c = a_{max} \quad (45)$$

Moreover, if the travel distance xm is larger than the maximum value indicated by the expression (43), the maximum damping speed $v_c$ m/s and the maximum damping acceleration $a_c$ m/s$^2$ have different values depending on the first, second and third high speeds.

That is, in the case of the first and second high speeds, if the travel distance xm falls within a range indicated by the following expression (46), the acceleration damping for two periods is performed.

$$3\frac{V_{max}}{f_c} < x \le \frac{8v_{freq}}{f_c} \quad (46)$$

Thereby, the maximum damping speed $v_c$ m/s is set to a value twice the value of the damping frequency speed $V_{freq}$, as indicated by the following expression (47).

$$v_c = 2v_{freq} \quad (47)$$

And, the maximum damping acceleration $a_c$ m/s$^2$ is set to a value (broken line LN in FIG. 12) equal to the maximum acceleration $a_{max}$ m/s$^2$, as indicated by the following expression (48).

$$a_c = a_{max} \quad (48)$$

And, if the travel distance xm falls within a range indicated by the following expression (49), the deceleration damping for four periods is performed.

$$8\frac{V_{freq}}{f_c} < x \le \frac{4v_{max}}{f_c} \quad (49)$$

Thereby, the maximum damping speed $v_c$ m/s is set to a one-fourth value of the product of the travel distance xm and the damping frequency $f_c$ Hz, as indicated by the following expression (50).

$$v_c = \frac{xf_c}{4} \quad (50)$$

And, the maximum damping acceleration $a_c$ m/s$^2$ is set to a value (broken line LO in FIG. 12) equal to the maximum acceleration $a_{max}$ m/s$^2$ as indicated by the following expression (51).

$$a_c = a_{max} \quad (51)$$

Moreover, if the travel distance xm is larger than the maximum value indicated by the expression (49), the maximum damping speed $v_c$ m/s and the maximum damping acceleration $a_c$ m/s$^2$ take different values depending on the first and second high speeds.

That is, in the case of the first high speed, if the travel distance xm falls within a range indicated by the following expression (52), the acceleration damping for two periods is performed.

$$4\frac{v_{max}}{f_c} < x \leq 2\frac{v_{max}V_{freq}}{f_c(v_{max}-2v_{freq})} \quad (52)$$

Thereby, the maximum damping speed $v_c$ m/s is set to a value twice the value of the damping frequency speed $V_{freq}$, as indicated by the following expression (53).

$$v_c = 2v_{freq} \quad (53)$$

And, the maximum damping acceleration $a_c$ m/s² is set to a value (broken line LP in FIG. 12) equal to the maximum acceleration $a_{max}$ m/s², as indicated by the following expression (54).

$$a_c = a_{max} \quad (54)$$

And, if the travel distance xm falls within a range indicated by the following expression (55), the acceleration damping for three periods is performed.

$$2\frac{v_{max}V_{freq}}{f_c(v_{max}-2v_{freq})} < x \quad (55)$$

Thereby, the maximum damping speed $v_c$ m/s is set to a value equal to the maximum speed $V_{max}$ m/s, as indicated by the following expression (56).

$$v_c = V_{max} \quad (56)$$

And, the maximum damping acceleration $a_c$ m/s² is set to a one-third value (solid line LM in FIG. 12) of the product of the maximum speed $V_{max}$ m/s and the damping frequency $f_c$ Hz, as indicated by the following expression (57).

$$a_c = \frac{v_{max}f_c}{3} \quad (57)$$

On the other hand, in the case of the second high speed, if the travel distance xm falls within a range indicated by the following expression (58), the acceleration damping for three periods is performed.

$$4\frac{v_{max}}{f_c} < x \quad (58)$$

Thereby, the maximum damping speed $v_c$ m/s is set to a value equal to the maximum speed $V_{max}$ m/s, as indicated by the following expression (59).

$$v_c = V_{max} \quad (59)$$

And, the maximum damping acceleration $a_c$ m/s² is set to a one-third value (solid line LM in FIG. 12) of the product of the maximum speed $V_{max}$ m/s and the damping frequency $f_c$ Hz, as indicated by the following expression (60).

$$a_c = \frac{v_{max}f_c}{3} \quad (60)$$

On the other hand, in the case of the third high speed, if the travel distance xm falls within a range indicated by the following expression (61), the acceleration damping for three periods is performed.

$$3\frac{v_{max}}{f_c} < x \quad (61)$$

Thereby, the maximum damping speed $v_c$ m/s is set to a value equal to the maximum speed $V_{max}$ m/s, as indicated by the following expression (62).

$$v_c = V_{max} \quad (62)$$

And, the maximum damping acceleration $a_c$ m/s² is set to a one-third value (solid line LM in FIG. 12) of the product of the maximum speed $V_{max}$ m/s and the damping frequency $f_c$ Hz, as indicated by the following expression (63).

$$a_c = \frac{v_{max}f_c}{3} \quad (63)$$

As described above, with respect to a speed classified into one of six levels (low speed, first and second middle speeds, first to third high speeds), the maximum damping speed $v_c$ m/s and the maximum damping acceleration $a_c$ m/s² can be determined according to a travel distance xm, depending on the result by the damping parameter generating/discriminating method.

Thereafter, at step SP4, the CPU 21 can generate the targeted locus in real time based on the maximum damping speed $v_c$ m/s, the maximum damping acceleration $a_c$ m/s², and the travel distance xm of the travel command information.

(4) Jerk-filter Operation Process

As a process following the aforementioned targeted locus generating procedure RT0 (FIG. 8), a control operation process using a so-called jerk filter is performed, so that the jerk (acceleration differential value) specific effect in which the acceleration variation is smoothed to cause movement so as not to excite any vibration in the high-frequency domain can be reflected on the generation of the targeted locus.

Assuming that the number of delayed samples is n (positive integer), the frequency to be attenuated through the jerk filter (hereinafter referred to as a jerk frequency) is $f_{jerk}$ Hz, the sampling frequency in the sampling value control is $f_{sample}$ Hz, and the delay operator in the sampling value control is $z^{-1}$, the response $G(z^{-1})$ in the jerk filter is represented by the following expression (64).

$$G(z^{-1}) = \frac{\sum_{i=0}^{n-1} z^{-i}}{n} \quad (64)$$

$$f_{jerk} = \frac{f_{sample}}{n} \quad (65)$$

The generation time of the targeted locus is longer by the number of samples n.

Figure 9:
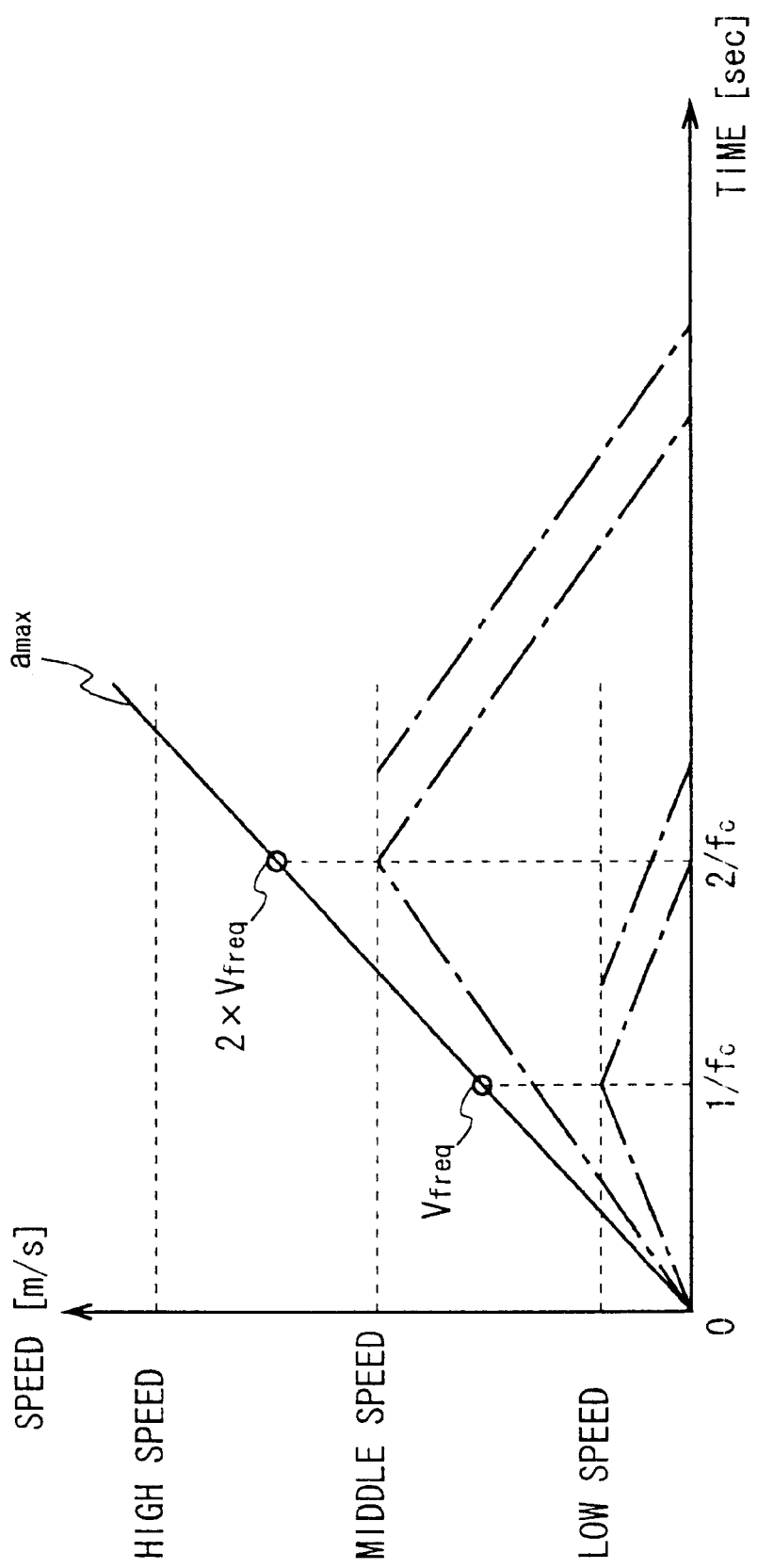
FIG. 9 is a graph explaining how to classify the maximum speed determined according to the specifications of the head drive system.

Using the response $G(z^{-1})$ in the jerk filter, the frequency properties F1, F2, F3 and F10 are shown in FIG. 9, wherein the number of samples n is taken to be 1, 2, 3 and 10. In FIG. 9, the axis of abscissas indicates the frequency normalized by the sampling frequency $f_{sample}$ Hz.

Figure 14A:
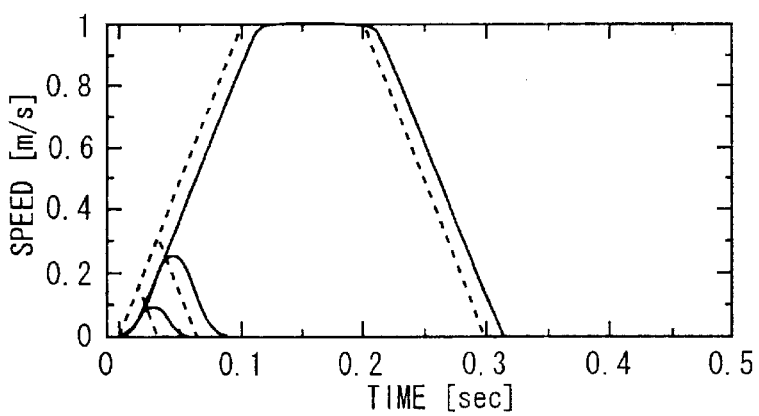
FIGS. 14A and 14B are graphs showing a speed and an acceleration before and after the use of the jerk filter.
Figure 14B:
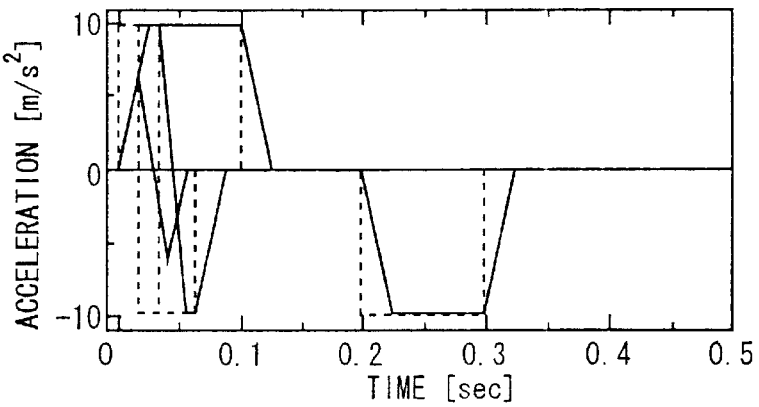

FIGS. 14A and 14B show the triangular speed waveforms and the trapezoidal speed waveforms before and after the use of the jerk filter (the case before use is indicated by the broken line, and the case after use is indicated by the solid line). In FIGS. 14A and 14B, the jerk filter has a number of samples n=100 and a sampling frequency $f_{sample}$ of 4000 Hz.

Using the jerk filter after generating the targeted locus, it is possible to clearly determine which frequency components are not stimulated by the targeted locus, to exactly know the delay time $1/f_{jerk}$sec, which occurs by the jerk, in the completion time of generating the targeted locus, and to almost arbitrarily decrease the vibration of comparatively high frequency components for the sampling interval which is a control period, by specifying the number of delayed samples n, under restraint in which the interval is a one-positive integer-th of the sampling interval.

In generating the targeted locus using the jerk filter, there is no need of classification based on the magnitude of jerk (acceleration differential value) to make a simplification, and there is no need of trial and error in setting the magnitude of jerk because the influence of the jerk on the residual vibration at the completion of positioning can be considered as the frequency properties of a filter.

Moreover, using the jerk filter as a feed forward controller, the properties of the jerk filter are reflected by being added to, that is, being convoluted in the frequency properties of the targeted locus with residual vibration reduced for the parameters of the maximum damping speed and the maximum damping acceleration to reduce the residual vibration, which are obtained in the damping parameter operation portion.

(5) Operation and Effect of this Embodiment

In the above configuration, in this mounter 1, in the case where the head 8 for adsorbing semiconductor devices is positioned to a desired position by moving it in the X-axis and the Y-axis directions, the maximum speed $V_{max}$m/s is determined based on the specifications of the head drive system to be classified into one of six levels (low speed, first and second middle speeds, first to third high speeds) under certain conditions.

Subsequently, as to the maximum speed $V_{max}$m/s of the head 8 classified into one of six levels, the maximum damping speed $v_c$m/s and the maximum damping acceleration $a_c$m/s$^2$ are determined so as to efficiently cancel the residual vibration which occurs in the head 8 by selectively switching the acceleration or deceleration damping depending on the travel distance xm.

Hereafter, the optimal targeted locus can be generated in real time in accordance with an operation pattern of the head 8, which varies at every moment, based on the maximum damping speed $v_c$m/s and the maximum damping acceleration $a_c$m/s$^2$ determined based on the travel distance xm of the head 8 as shown by step SP4 in FIG. 8.

In this way, by specifying the frequency of residual vibration which is a relatively low frequency, which has a large vibration amplitude and occurs at the completion of positioning the head 8, the targeted locus having reduced frequency inducing the residual vibration and its positive integer multiple, the frequency component can be generated by adjusting the maximum damping speed $v_c$m/s and the maximum damping acceleration $a_c$m/s$^2$ according to the travel distance xm.

Moreover, even when the load of the head 8 is changed while the head 8 is moved, and thereby the condition of the residual vibration, which occurs at the time of positioning, is changed, it is possible to deal with the residual vibration which fluctuates for each travel by reflecting the frequency of residual vibration as the damping frequency in issuing a travel command, if the condition of the residual vibration of the head 8 at the completion of positioning is grasped in advance.

In addition, after the targeted locus for determining an operation pattern of the head 8 is generated, the vibration of relatively high-frequency components can be decreased by the jerk filter, without considering the jerk in generating the targeted locus, whereby the targeted locus with less arithmetical operation amount can be generated.

With the above constitution, in this mounter 1, when the head 8 in movement is located at a desired position, the vibration component that is an integer multiple of the residual vibration frequency is damped by adjusting the acceleration/deceleration duration and the timing of starting the deceleration in accordance with the vibration period of residual vibration which occurs in the head 8 at the completion of positioning, under the constraints of the maximum speed $V_{max}$m/s and the maximum acceleration $a_{max}$m/$^2$ determined according to the specifications of the head drive system, and then the adjustment results are reflected on the generation of the targeted locus. Thereby, the residual vibration which occurs in the head 8 at the time of positioning can be canceled efficiently, and the mounter 1 capable of positioning the head 8 faster than conventional ones can be realized.

Moreover, by using the jerk filter after generating the targeted locus, a faster targeted locus can be generated because the vibration of relatively high frequency components can be decreased. Thereby, the residual vibration which occurs in the head 8 at the time of positioning can be canceled more efficiently, and thus the mounter 1 capable of positioning the head 8 faster than conventional ones can be realized.

(6) Other Embodiments

In the above embodiment, the mounter 1 is applied as a positioning device for moving a subject of positioning at a desired position, as shown in FIG. 4. However, this invention is not limited to the above embodiment, and it can be applied to various positioning devices in which the subject of positioning is driven by a drive source and has a motive power transferred.

Also, in the above embodiment, presuming that the CPU 21 as the control means controls the actuator (drive means) 30 to move the head (subject of positioning) 8 at a desired speed and acceleration, the actuator 30 is controlled by adjusting the acceleration/deceleration duration of the head 8 and the timing of starting the deceleration to cancel the residual vibration in accordance with the vibration period of the residual vibration which occurs immediately after positioning the head 8. However, this invention is not limited to the above embodiment, but in essence, the actuator 30 can be controlled for driving by other methods, so long as the residual vibration can be canceled even if the acceleration/deceleration duration of the head 8 is shorter than the vibration period of residual vibration which occurs immediately after positioning the head 8.

Moreover, in this embodiment, the CPU 21 as the control means adjusts the acceleration/deceleration duration of the head 8 to the duration equivalent to a positive integer multiple of one period of the residual vibration by applying vibration with the same force in the same direction after a half period of residual vibration which occurs immediately after positioning the head 8, and it adjusts the timing of starting the deceleration for the head 8 to the time equivalent to a positive integer multiple of one period of residual vibration after the acceleration start time, by applying vibration with the same force in the opposite direction after a positive integer multiple of one period of the residual vibration. However, this invention is not limited to the above embodiment, but the acceleration/deceleration duration of the head 8 and the timing of starting the deceleration can be adjusted in various ways so long as the residual vibration can be canceled.

Moreover, in the above embodiment, the CPU 21 as the control means classifies the maximum speed determined according to the specifications of the actuator (drive means) 30 into one of six levels, and it adjusts the acceleration/deceleration duration of the head 8 and the timing of starting the deceleration in accordance with the vibration period of residual vibration which occurs immediately after positioning the head 8, at each level. However, this invention is not limited to this embodiment, but the maximum speed can be classified into one of more or less than six levels under the restraints of the maximum speed determined according to the specifications of the drive means.

While there have been described in connection with the inventions preferred embodiments of the invention, it will be obvious to those skilled in the art that various changes and modifications may bemade, therefore, to cover in the appended claims all such changes and modifications as fall within the true spirit and scope of the invention.

What is claimed is:

1. A positioning device for moving a subject of positioning to a desired position, comprising:

drive means for driving to move said subject of positioning; and control means for controlling said drive means to move said subject of positioning at a desired speed and acceleration, wherein said control means controls said drive means to adjust the acceleration/deceleration duration of said subject of positioning and the timing of starting the deceleration so as to cancel residual vibration, in accordance with the vibration period of said residual vibration that occurs immediately after positioning said subject of positioning, wherein said control means, a half period of said residual vibration after a force which causes the residual vibration is applied, applies vibration with the same force in the same direction to adjust the acceleration/deceleration duration of said subject of positioning to the duration that is a positive integer multiple of one period of said residual vibration, and also an integer multiple of one period of said residual vibration after a force which causes the residual vibration is applied, applies vibration with the same force in the opposite direction to adjust the timing of starting the deceleration for said subject of positioning to an integer multiple of one period of said residual vibration after the acceleration start time.

2. The positioning device according to claim 1, wherein said control means classifies the maximum speed determined according to the specifications of said drive means into one of plural levels and adjusts the acceleration/deceleration duration of said subject of positioning and the timing of starting the deceleration in accordance with the vibration period of said residual vibration for each level.

3. The positioning device according to claim 1, wherein said control means has a jerk filter and adjusts the acceleration/deceleration duration of said subject of positioning and the timing of starting the deceleration and then performs filtering on the adjusted result through said jerk filter.

4. A positioning method for moving a subject of positioning to a desired position, comprising:

the first step of moving said subject of positioning at a desired speed and acceleration; and the second step of adjusting the acceleration/deceleration duration of said subject of positioning and the timing of starting the deceleration so as to cancel residual vibration, in accordance with the vibration period of said residual vibration that occurs immediately after positioning said subject of positioning, wherein said second step, a half period of said residual vibration after a force which causes said residual vibration is applied, applies vibration with the same force in the same direction to adjust the acceleration/deceleration duration of said subject of positioning to the duration that is a positive integer multiple of one period of said residual vibration, and also a positive integer multiple of one period of said residual vibration after a force which causes said residual vibration is applied, applies vibration with the same force in the opposite direction to adjust the timing of starting the deceleration for said subject of positioning to a positive integer multiple of one period of said residual vibration after the acceleration start time.

5. The positioning method according to claim 4, wherein said second step classifies the maximum speed determined according to the specifications of a drive system for moving said subject of positioning into one of plural levels and adjusts the acceleration/deceleration duration of said subject of positioning and the timing of starting the deceleration in accordance with the vibration period of said residual vibration for each level.

6. The positioning method according to claim 4, comprising the third step of, after the acceleration/deceleration duration of said subject of positioning and the timing of starting the deceleration are adjusted at said second step, performing filtering on the adjusted result through a jerk filter.

7. A positioning device for moving a subject of positioning to a desired position, comprising:

drive means for driving to move said subject of positioning; and control means for controlling said drive means to move said subject of positioning at a desired speed and acceleration, wherein said control means controls said drive means to adjust the acceleration/deceleration duration of said subject of positioning and the timing of starting the deceleration so as to cancel residual vibration, in accordance with the vibration period of said residual vibration that occurs immediately after positioning said subject of positioning, wherein said control means classifies the maximum speed determined according to the specifications of said drive means into one of plural levels and adjusts the acceleration/deceleration duration of said subject of positioning and the timing of starting the deceleration in accordance with the vibration period of said residual vibration for each level.

8. The positioning device according to claim 7, wherein said control means, a half period of said residual vibration after a force which causes the residual vibration is applied, applies vibration with the same force in the same direction to adjust the acceleration/deceleration duration of said subject of positioning to the duration that is a positive integer multiple of one period of said residual vibration, and also an integer multiple of one period of said residual vibration after a force which causes the residual vibration is applied, applies vibration with the same force in the opposite direction to adjust the timing of starting the deceleration for said subject of positioning to an integer multiple of one period of said residual vibration after the acceleration start time.

9. The positioning device according to claim 7, wherein said control means has a jerk filter and adjusts the acceleration/deceleration duration of said subject of positioning and the timing of starting the deceleration and then performs filtering on the adjusted result through said jerk filter.

10. A positioning method for moving a subject of positioning to a desired position, comprising:

the first step of moving said subject of positioning at a desired speed and acceleration; and the second step of adjusting the acceleration/deceleration duration of said subject of positioning and the timing of starting the deceleration so as to cancel residual vibration, in accordance with the vibration period of said residual vibration that occurs immediately after positioning said subject of positioning, wherein said second step classifies the maximum speed determined according to the specifications of a drive system for moving said subject of positioning into one of plural levels and adjusts the acceleration/deceleration duration of said subject of positioning and the timing of starting the deceleration in accordance with the vibration period of said residual vibration for each level.

11. The positioning method according to claim 10, wherein said second step, a half period of said residual vibration after a force which causes said residual vibration is applied, applies vibration with the same force in the same direction to adjust the acceleration/deceleration duration of said subject of positioning to the duration that is a positive integer multiple of one period of said residual vibration, and also a positive integer multiple of one period of said residual vibration after a force which causes said residual vibration is applied, applies vibration with the same force in the opposite direction to adjust the timing of starting the deceleration for said subject of positioning to a positive integer multiple of one period of said residual vibration after the acceleration start time.

12. The positioning method according to claim 10, comprising the third step of, after the acceleration/deceleration duration of said subject of positioning and the timing of starting the deceleration are adjusted at said second step, performing filtering on the adjusted result through a jerk filter.

* * * * *